United States Patent
Srnka et al.

(10) Patent No.: US 8,437,961 B2
(45) Date of Patent: May 7, 2013

(54) TIME LAPSE ANALYSIS WITH ELECTROMAGNETIC DATA

(75) Inventors: Leonard J. Srnka, Bellaire, TX (US); James J. Carazzone, Houston, TX (US); Dmitriy A. Pavlov, The Woodlands, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 1029 days.

(21) Appl. No.: 12/280,509

(22) PCT Filed: Mar. 6, 2007

(86) PCT No.: PCT/US2007/005816
§ 371 (c)(1),
(2), (4) Date: Aug. 22, 2008

(87) PCT Pub. No.: WO2007/130205
PCT Pub. Date: Nov. 15, 2007

(65) Prior Publication Data
US 2009/0005994 A1    Jan. 1, 2009

Related U.S. Application Data

(60) Provisional application No. 60/797,560, filed on May 4, 2006.

(51) Int. Cl.
*G01V 1/40* (2006.01)
*G06F 11/30* (2006.01)

(52) U.S. Cl.
USPC ............... 702/7; 702/127; 702/182; 702/189

(58) Field of Classification Search ........................ 702/7
See application file for complete search history.

(56) References Cited

U.S. PATENT DOCUMENTS 4,617,518 A   10/1986   Srnka ............................ 324/365
5,095,273 A    3/1992   Kennedy et al. ............... 324/376
(Continued)

FOREIGN PATENT DOCUMENTS
WO    WO 02/14906      2/2002
WO    WO2004/008183    1/2004
(Continued)

OTHER PUBLICATIONS

*European Search Report*, dated Dec. 11, 2010, EP No. 07752508.7.
(Continued)

*Primary Examiner* — Phuong Huynh
(74) *Attorney, Agent, or Firm* — ExxonMobil Upstream Research Company

(57) ABSTRACT

Method for determining time-dependent changes [73] in the earth vertical and horizontal electrical resistivity and fluid saturations from offshore electromagnetic survey measurements. The method requires both online and offline data, which should include at least one electromagnetic field component sensitive at least predominantly to vertical resistivity and another component sensitive at least predominately to horizontal resistivity [62]. Using a horizontal electric dipole source, online Ez and offline Hz measurements are preferred. For a horizontal magnetic dipole source, online H2 and offline E2 data are preferred. Magnetotelluric data may be substituted for controlled source data sensitive at least predominantly to horizontal resistivity. Maxwell's equations are solved by forward modeling [64,65] or by inversion [66,67], using resistivity models of the subsurface that are either isotropic contrast, and [64,66] or anisotropic [65,67]. Fluid saturation is determined from the vertical and horizontal resistivities using empirical relations or rock physics models [70].

26 Claims, 6 Drawing Sheets

U.S. PATENT DOCUMENTS

| | | | |
|---|---|---|---|
| 5,563,513 A | | 10/1996 | Tasci et al. |
| 5,586,082 A | * | 12/1996 | Anderson et al. ............... 367/73 |
| 5,789,989 A | * | 8/1998 | Paschal et al. .................. 331/57 |
| 6,603,313 B1 | | 8/2003 | Srnka ............................ 324/354 |
| 6,739,165 B1 | | 5/2004 | Strack ............................... 72/13 |
| 6,864,684 B2 | | 3/2005 | Ellingsrud et al. ............ 324/337 |
| 7,038,456 B2 | | 5/2006 | Ellingsrud et al. ............ 324/334 |
| 7,263,443 B2 | * | 8/2007 | Clavaud ............................ 702/7 |
| 7,324,898 B2 | * | 1/2008 | Frenkel ............................ 702/7 |
| 2003/0050759 A1 | | 3/2003 | Srnka et al. ....................... 702/7 |
| 2005/0149307 A1 | * | 7/2005 | Gurpinar et al. ............... 703/10 |
| 2006/0186889 A1 | * | 8/2006 | Andreis ........................ 324/345 |

FOREIGN PATENT DOCUMENTS

| | | |
|---|---|---|
| WO | WO2004/049008 | 6/2004 |
| WO | WO2004/053528 | 6/2004 |
| WO | WO2004/086090 | 10/2004 |
| WO | WO2005/096021 | 10/2005 |
| WO | WO2005/117326 | 12/2005 |
| WO | WO2006/135510 | 12/2006 |

OTHER PUBLICATIONS

International Search Report dated Feb. 19, 2008 for PCT/US07/05816 filed Mar. 6, 2007.
European Search Report, (2006), RS 113931, Aug. 18, 2006, 3 pgs.
Archie, G. E. (1942) "The Electrical Resistivity Log as an Aid in Determining Some Reservoir Characteristics" *Trans. American Inst. Mech. Eng.* 146, pp. 54-62.
Chave, A. D. et al. (1991) "Electrical Exploration Methods for the Seafloor," *Electromagnetic Methods in Applied Geophysics*, Society of. Exploration Geophysicists, 2, pp. 931-966.
Chlamtac, M. et al. (1981) "The Electromagnetic Fields of a Horizontal Dipole Over a Vertically Inhomogeneous and Anisotropic Earth" *Geophysics* 46.6, pp. 904-915.
Christensen, N. B. (2000) "Difficulties in Determining Electrical Anisotropy in Subsurface Investigations," *Geophysical Prospecting*, v. 48, pp. 1-19.
Constable, S. C. et al. (1998) "Marine Magnetotellurics for Petroleum Exploration Part 1: A Sea-Floor Equipment System" *Geophysics* 63.3, pp. 816-825.
Edwards, R. N. et al. (1984) "Offshore Electrical Exploration of Sedimentary Basins: The Effects of Anisotropy in Horizontally Isotropic, Layered Media" *Geophysics* 49.5, pp. 566-576.
Eidesmo, T. et al. (2002) "Sea Bed Logging (SBL), a New Method for Remote and Direct Identification of Hydrocarbon Filled Layers in Deepwater Areas" *First Break*, 20.3, pp. 144-152.
Hoversten, G. M. et al. (2000) "Marine Magnetotellurics for Base-of-Salt Mapping: Gulf of Mexico Field Test at the Gemini Structure" *Geophysics* 65.5, pp. 1476-1488.
Hoversten, G. M. et al. (2003) "Pressure and Fluid Saturation Prediction in a Multicomponent Reservoir Using Combined Seismic and Electromagnetic Imaging", *Geophysics* 68.5, pp. 1580-1591.
Hoversten, G. M. et al. (2006) "Direct Reservoir Parameter Estimation Using Joint Inversion of Marine Seismic AVA and CSEM Data", *Geophysics*, v. 71.3, pp. C1-C13.
Jupp, D.L.B. et al. (1977) "Resolving Anisotropy in Layered Media by Joint Inversion" *Geophysical Prospecting* 25, pp. 460-470.
Kaufman, A. A. et al. (1983) *Frequency and Transient Soundings*, pp. 300-313, Elsevier, N.Y.
Kaufman, A. A. et al. (1983) *Frequency and Transient Soundings*, pp. 257-284, Elsevier, N.Y.

Keller, G. V. et al. (1966) *Electrical Methods in Geophysical Prospecting*, pp. 20-33, Pergamon.
Keller, G. V. et al. (1966) *Electrical Methods in Geophysical Prospecting*, pp. 33-39, Pergamon.
Linde, N. et al. (2004) "Evidence of Electrical Anisotropy in Limestone Formations Using the RMT Technique" *Geophysics* 69.4, pp. 909-916.
Loke, M. H. (2001) "Constrained Time-Lapse Resistivity Imaging Inversion", paper EEM-7, *Proceedings of the SAGEEP Symposium*, Denver, Mar. 3-7, 12 pgs.
MacGregor, L. et al. (2001) "Electrical resistivity structure of the Valu Fa Ridge, Lau Basin, from marine controlled-source electromagnetic sounding", *Geophysics Journal Int.*, 146, pp. 217-236.
Negi, J. G. et al. (1989) *Anisotropy in Geoelectromagnetism*, pp. 98-109, Elsevier, N.Y.
Newman, G. A. et al. (1999) "Three Dimensional Electromagnetics" (Oristaglio and Spies, eds.) *Soc. Expl. Geophysicists*, Tulsa, pp. 299-321.
Rector, J. W. (1995) "Special Issue—Crosswell Methods: Where are we, where are we going", *Geophysics* 60.6, pp. 629-630.
Srnka, L. et al (2005) "Remote Reservoir Resistivity Mapping—Breakthrough Geophysics for the Upstream", *Abstract 17284, Offshore Technology Conference*, Houston, TX, May 2005, 2 pgs.
Srnka, L. (2005) "Remote Reservoir Resistivity Mapping", *Society of Exploration Geophysicists 75th Annual Meeting Extended Abstracts*, Houston, TX, Nov. 2005, paper SS 3.3.
Tompkins, M. J. et al. (2004) "Effects of Vertical Anisotropy on Marine Active Source Electromagnetic Data and Inversions," *EAGE 65th Annual Conv.*, Paris, France, Abstract E026., 4 pgs.
Watson et al. (1999) "Differentiating Anisotropy and Lateral Effects Using Azimuthal Resistivity Offset Wenner Soundings" *Geophysics* 64.3, pp. 739-745.
Weiss, C. J. et al. (2002) "Electromagnetic Induction in a Fully 3-D Anisotropic Earth" *Geophysics* 67.4, pp. 1104-1114.
Weiss, C. J. et al. (2003) "Electromagnetic Induction in a Generalized 3D Anisotropic Earth, Part 2: The LIN Preconditioner" *Geophysics* 68.3, pp. 922-930.
Yin, C. et al. (1999) "Geoelectrical Fields in a Layered Earth With Arbitrary Anisotropy," *Geophysics*, 64.2, pp. 426-434.
Yin, C. et al. (2001) "Electromagnetic Induction in a Layered Earth With Arbitrary Anisotropy" *Geophysics* 66.5, pp. 1405-1416.
Zhdanov, M. S. et al. (1994) *The Geoelectrical Methods in Geophysical Exploration*, pp. 119-124, Elsevier, N.Y.
Zhdanov, M. S. et al (2003) "Three-Dimensional Marine Magnetotellurics for Petroleum Exploration", *SEG 2003 Annual Meeting Expanded Abstracts*, pp. 541-544.
Carazzone, J. et al. (2005), "Three dimensional imaging of marine CSEM data," *Extended Abstract*, EM 3.3. SEG Annual Meeting, Houston, Texas, Nov. 2005, pp. 575-579.
Ellingsrud, S. et al. (2002), "Remote sensing of hydrocarbon layers by seabed logging (SBL): Results from a cruise offshore Angola," *The Leading Edge*, pp. 972-982.
Gasperikova, E. et al. (2004), "A Feasibility Study of Nonseismic Geophysical Methods for Monitoring Geologic $CO_2$ Sequestration," *The Leading Edge*, pp. 1282-1288.
Weaver, R. et al. (2004), "Sensitivity to Hydrocarbon Targets Using Marine Active Source EM Sounding," EAGE $66^{th}$ Conf. & Exhibition, Paris, France, Jun. 2004, 4 pgs.

* cited by examiner

TIME LAPSE ANALYSIS WITH ELECTROMAGNETIC DATA

CROSS-REFERENCE TO RELATED APPLICATIONS

This application is the National Stage of International Application No. PCT/US2007/005816, filed on 6 Mar. 2007, which claims the benefit of now expired U.S. Provisional Application No. 60/797,560 filed on May 4, 2006.

FIELD OF THE INVENTION

This invention relates generally to the field of geophysical prospecting, and more particularly to controlled-source electromagnetic surveys typically in offshore environments, in which a controlled electromagnetic transmitter is towed above or positioned between electromagnetic receivers on the sea floor, for the purposes of hydrocarbon exploration, development, and production. Specifically, the invention is a method for determining the difference between the electrical resistivity of a subsurface reservoir at an initial time and its electrical resistivity at one or more later times, and relating that difference to production of hydrocarbons from the reservoir during the interim period.

BACKGROUND OF THE INVENTION

This invention addresses the problem of determining the three-dimensional (3D) distribution of hydrocarbon fluids within a subsurface reservoir, which often will be located beneath a body of water such as beneath the sea, during the time period (or periods) of hydrocarbon production from that reservoir Applications of seismic methods to this problem are called time-lapse or 4D methods. A critical issue for economical production of hydrocarbons (gas, gas condensate, and oil) from reservoirs is accurate knowledge of the distribution of hydrocarbon saturation within the porous rocks that comprise the reservoir. As hydrocarbons are produced from the reservoir, the hydrocarbon saturation decreases and the water saturation increases in a non-uniform manner within the reservoir. Although seismic methods have been developed for 4D applications to monitor reservoir fluids, such methods are expensive, and are often ineffective due to the relatively low sensitivity of the seismic response to changes in hydrocarbon saturation. Such low sensitivity is particularly true for oil reservoirs, because the acoustic properties of most oils are very similar to those of the reservoir formation waters and thus changes in oil saturation are not reflected in the seismic response.

Other methods are known in the art for estimating reservoir fluid properties. Hydrocarbon resistivity and saturation data are available during reservoir depletion from borehole (downhole or well log) methods within a few meters of the wellbore. However, well logging methods are not effective between wells that are usually spaced hundreds to thousands of meters apart as found in many hydrocarbon fields, due to the limited penetration distance of the probing signals into the reservoir from the downhole well logging apparatus. In addition, production wells are usually enclosed with electrically conductive casing, which severely limits the use of electrical methods to monitor reservoir fluid resistivity since the reservoir is shielded from the electrical probing signal by the casing (except at very low frequency).

Reservoir fluid resistivity and saturation data are also available during reservoir depletion from cross-borehole (crosswell) methods, using seismic or electromagnetic energy (c.f. Rector, W. J. (ed.), "Crosswell Methods: Special Issue", *Geophysics* 60, no. 3 (1995)). However, crosswell methods require at least two wells to be used simultaneously for the measurement, which is expensive since production from both wells must be stopped and the production tubing must be removed from the wells. In addition, crosswell data provide primarily two-dimensional measurements in the common vertical plane that connects the measurement wells. Most wells in sub-sea reservoirs are deviated from the vertical, which limits the amount of common vertical plane between well pairs. Also, crosswell methods are not effective between wells that are usually spaced hundreds to thousands of meters apart as found in many hydrocarbon fields, due to the limited penetration distance of the probing signals from the downhole source. And in a similar fashion to the single-well logging case, the presence of electrically conductive casing in production wells severely limits the ability to use crosswell electrical methods to detect reservoir fluid resistivity.

Another method that is used routinely to estimate fluid saturation between wells is the mathematical simulation of reservoir fluid flow. However reservoir simulation necessarily incorporates many simplifications and assumptions about the properties of the rocks between the wells, in order to make the mathematical simulation practical on even a large computer. Reservoir simulation also requires continual adjustment of numerical parameters in the model to match the data measured in wells, the so-called "history matching" approach, and these parameters may not have a simple connection to measured rock and fluid properties.

Results from offshore controlled-source electromagnetic ("CSEM") surveys, such as those collected using the methods disclosed in U.S. Pat. No. 4,617,518 to Srnka and the previously referenced U.S. Pat. No. 6,603,313 and U.S. Patent Publication No. 2003/0050759, have shown that the bulk resistivity of fluids in hydrocarbon reservoirs can be determined remotely. To a good first approximation, marine CSEM data obtained using a horizontal electric dipole (HED) source are primarily sensitive to the net vertical resistance (bulk resistivity times net vertical thickness) of the subsurface reservoir (Kaufman and Keller, *Frequency and Transient Soundings*, 300-313, Elsevier (1983)). A survey offshore West Africa (Eidesmo, et al., *First Break*, 20, 144-152 (2002); Ellingsrud et al., *The Leading Edge*, 972-982 (2002)) confirmed that subsurface resistivity caused by the presence of hydrocarbons can be detected.

It is known that the earth's electrical resistivity can be aniostropic. See, for example, Keller and Frischnecht, *Electrical Methods in Geophysical Prospecting*, 33-39, Pergamon (1966); Kaufmann and Keller, *Frequency and Transient Soundings*, 257-284, Elsevier, N.Y. (1983); Negi, et al., *Anisotropy in Geoelectromagnetism*, Elsevier, N.Y. (1989); and Zhdanov and Keller, *The Geoelectrical Methods in Geophysical Exploration*, 119-124, Elsevier, N.Y. (1994). Several publications teach how to calculate (model) the anisotropic earth electrical responses for various controlled sources. See, for example, Chlamtac and Abramovici, *Geophysics* 46, 904-915 (1981); Yin and Weidelt, *Geophysics* 64, 426-434 (1999); Yin and Maurer, *Geophysics* 66, 1405-1416 (2001). Also, several authors discuss the interpretation of azimuthal electrical anisotropy (for example, Watson and Barker, *Geophysics* 64, 739-745 (1999); and Linde and Peterson, *Geophysics* 69, 909-916 (2004)). Others discuss the interpretation of anisotropy (Jupp and Vozoff, *Geophys. Prospecting* 25, 460-470 (1977); Edwards, et al., *Geophysics* 49, 566-576 (1984); and Christensen, *Geophys. Prospecting* 48, 1-9 (2000)) from data acquired using a variety of controlled electromagnetic sources.

U.S. Pat. No. 6,739,165 to Strack discloses a method to monitor changes in the electrical resistivity of a reservoir by measuring changes in electric and magnetic field data at the earth's surface, due to excitations by controlled galvanic and inductive sources and by natural magnetotelluric sources, that must include measuring resistivity changes in at least one wellbore that penetrates the reservoir. Strack does not disclose the use of imaging or inversion to map the distribution of bulk reservoir resistivity $\rho_r$ or hydrocarbon saturation $S_{hc}$, and does not discuss electrical anisotropy.

Johnstad, et al., in patent publication No. WO 2004/086090, disclose a method for reservoir resistivity monitoring similar to Strack, but which includes a downhole electromagnetic source that is constructed by transmitting electrical energy from the seafloor into the reservoir through the electrically conductive casing that lines the well. The authors do not disclose the use of 3D imaging or 3D inversion to determine $\rho_r$ or $S_{hc}$, and do not disclose how to include the effects of electrical anisotropy.

Constable, in patent publication WO 2004/053528 (2004), A1, discusses a method for real-time monitoring of hydrocarbon reservoirs. He proposes using various vertical and horizontal electric dipole sources and natural electromagnetic (e.g. magnetotelluric) sources, singly or in combinations, together with seafloor antennas containing electric and magnetic sensors in various arrays distributed over an area containing a hydrocarbon reservoir. The seafloor antennas can be permanently fixed to the seafloor or can be emplaced separately at several times. Constable's method for monitoring time changes in the bulk electrical resistivity $\rho_r$ of the reservoir consists of measuring the electrical impedance of the earth at each source-receiver combination, using the two orthogonal horizontal and the vertical electric field components of the receiver signals that are responsive to the energy from the transmitter, and mapping these impedances over the area of the reservoir. The magnetotelluric data can be used optionally to help determine the electrical background (non-reservoir volume of the earth). No mathematical inversion or imaging of the receiver signals, of any dimensionality, and no method for including the effects of anisotropy, are disclosed.

Loke ("Constrained Time-Lapse Resistivity Imaging Inversion", paper EEM-7, Proceedings of the SAGEEP Symposium, Denver, Mar. 3-7, 2001) describes the use of 2D constrained imaging inversion to measure time changes in subsurface resistivity for environmental applications. Loke discloses the use of the resistivity inversion result obtained at the initial survey time as a starting model for the resistivity inversion performed at a later time, in order to reduce artifacts in the result that may be introduced by effects other than changes in subsurface resistivity, such as acquisition system changes. This publication limits its discussion to DC resistivity surveys, and uses a data example obtained from an onshore Wenner-Schlumberger array, a survey method well known to practioners of the art. No anisotropic effects are discussed by Loke, nor does Loke discuss offshore data, the use of multiple components of the data, or hydrocarbon applications.

Gasperikova, et al. ("A Feasibility Study of Geophysical Methods for Monitoring Geologic CO2 Sequestration", Extended Abstract RC 3.8, SEG Annual Meeting, Denver, Colo., October 2004) discuss the use of onshore electric field measurements associated with excitation by a grounded HED source to measure the change in water saturation (or $1-S_{hc}$) in the Schrader Bluff field on the North Slope of Alaska as a consequence of CO2 injection, based on 3D forward modeling. Time-dependent changes are simulated by differencing the forward model calculations at the appropriate times. The paper does not describe which component(s) of the electric field are optimal for this measurement, nor are any anisotropic effects discussed.

Hoversten, et al. ("Direct Reservoir Parameter Estimation using Joint Inversion of Seismic AVO and marine CSEM Data", *Extended Abstract* RC 2.1, SEG Annual Meeting, Denver, Colo., October 2004) disclose a method for 1D (plane-layered earth) simultaneous inversion of seismic reflection and marine CSEM seafloor data (HED source). The CSEM data are restricted to inline online electric field data (i.e. Ex on the source line, see FIG. 1). Hoversten et al. (2004) do not teach time lapse methods for reservoir monitoring, nor do they teach how to include earth electrical anisotropy in the inversions.

Accordingly there is a need for a method to directly estimate the hydrocarbon saturation throughout the reservoir in a 3D sense by remotely measuring and imaging a subsurface physical parameter that is highly sensitive to that saturation, and to be able to repeat that measurement/imaging and analyze the data as the reservoir fluids are produced. Such a method must account for resistivity anisotropy. The present invention satisfies this need.

SUMMARY OF THE INVENTION

In one embodiment, the invention is a method for determining time-dependent changes in the hydrocarbon content of a subsurface reservoir from controlled-source electromagnetic survey data obtained from the subsurface region containing the reservoir, said method comprising:

(a) obtaining electromagnetic field data recorded at a plurality of online and offline (relative to a survey source line) receiver locations from an initial survey of the subsurface region, and corresponding survey results from at least one later survey of the same region conducted under substantially the same conditions, said data comprising a field component sensitive at least predominantly to vertical resistivity and a field component sensitive at least predominantly to horizontal resistivity;

(b) for each survey, solving Maxwell's electromagnetic field equations for horizontal resistivity and vertical resistivity at a plurality of (x, y, z) positions in the subsurface reservoir, using survey acquisition parameters and the measured electromagnetic field data; and (c) comparing calculated resistivity results between the surveys.

Hydrocarbon fluid saturation values may be calculated from the horizontal and vertical resistivities using Archie's law or other relationship, and comparison of the imaged results for this parameter between time-separated surveys provides a basis to analyze changes as reservoir hydrocarbons are produced over time.

BRIEF DESCRIPTION OF THE DRAWINGS

The present invention and its advantages will be better understood by referring to the following detailed description and the attached drawings in which.

Figure 1:
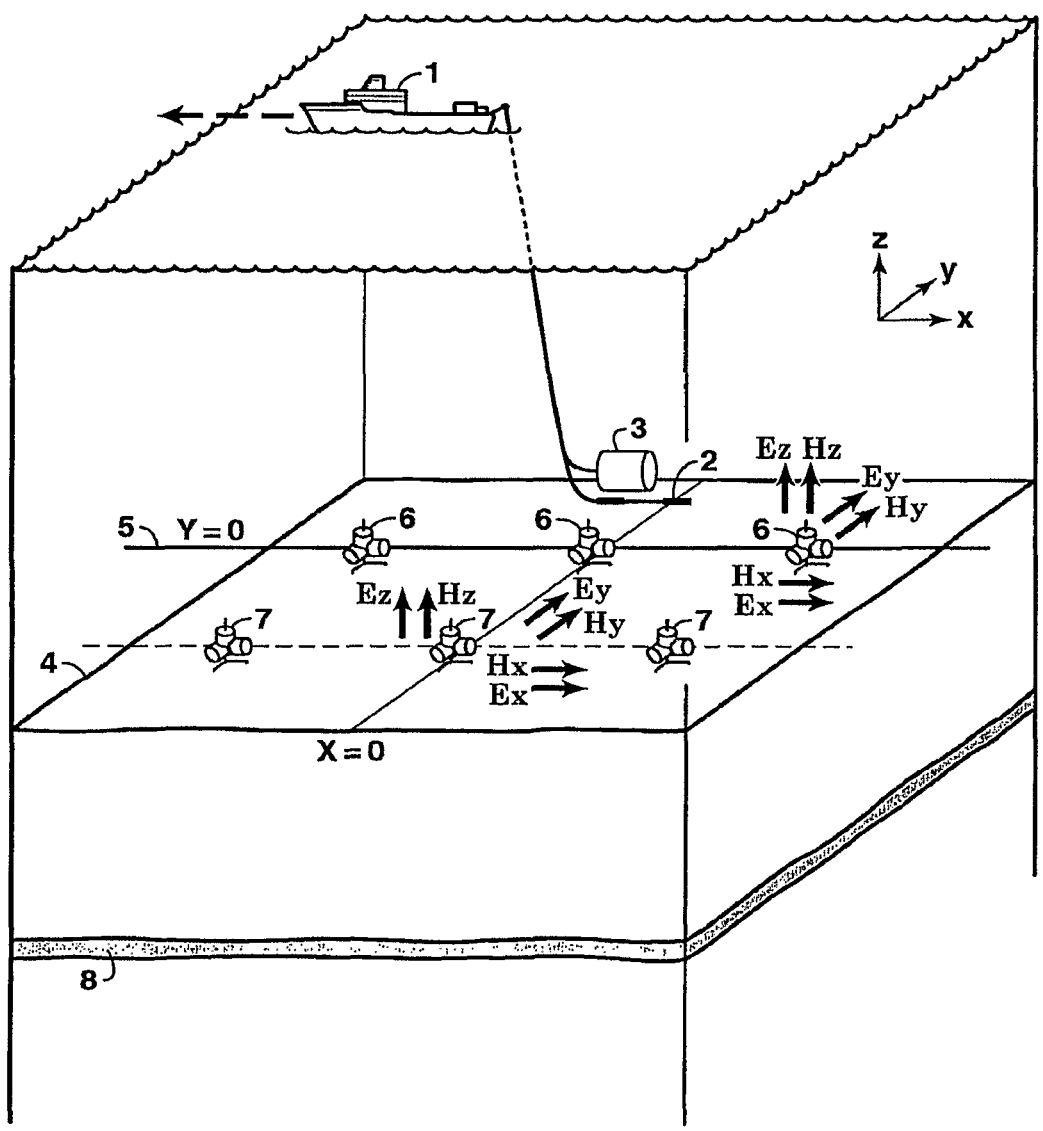
FIG. 1 illustrates a survey geometry suitable for an embodiment of the present invention in which both horizontal electric and horizontal magnetic sources are used, in combination with a plurality of multiple-component electromagnetic receivers located both online and offline.

The invention will be described in connection with its preferred embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the spirit and scope of the invention, as defined by the appended claims.

DETAILED DESCRIPTION OF THE PREFERRED EMBODIMENTS

The invention is a method for determining time-dependent changes in the vertical and horizontal electrical resistivities within an offshore subsurface region such as a hydrocarbon reservoir due to changes in reservoir properties such as the rock pore fluid saturation. One cause of such changes is the intentional extraction or injection of fluids as performed in hydrocarbon production. The invention requires measured controlled-source electromagnetic (CSEM) survey data at an initial time and at one or more later times, for at least one online electromagnetic field component and at least one offline component, the selection of particular components depending upon the source type. The invention makes use of the realization that certain electromagnetic field components are sensitive predominantly or almost exclusively to either vertical resistivity or horizontal resistivity, but not both, whereas other field components are sensitive to both resistivities. The invention also makes use of the realization that changes in the fluid saturation of a hydrocarbon reservoir will change both the vertical and horizontal resistivities within the reservoir, since reservoirs predominantly contain internal layering and other structures and thus usually exhibit electrical vertically transverse isotropy (EVTI). Since reservoir thicknesses are usually small compared to the reservoir depth of burial, it is realized in this invention that the vertical resolution of the EVTI within the reservoir interval will be substantially less than the reservoir thickness. This lower spatial resolution within the reservoir is a consequence of the fact that low electromagnetic source frequencies, typically less than 1 Hertz, must be used to penetrate to the reservoir depth due to the well known electromagnetic skin depth effect. It follows that the frequencies needed for high spatial resolution within the thinner reservoir are typically absent in the reservoir response data measured remotely, since those higher frequencies only penetrate to much less than the reservoir depth.

Recent developments in marine controlled-source electromagnetic (CSEM) surveying now provide a means to determine remotely the resistivity of a subsurface reservoir using both iterative forward modeling or mathematical inversion (Srnka, "Remote Reservoir Resistivity Mapping", Society of Exploration Geophysicists 75th Annual Meeting *Extended Abstracts*, Houston, November 2005, paper SS 3.3). Srnka, et al ("Remote Reservoir Resistivity Mapping—Breakthrough Geophysics for the Upstream", Abstract 17284, Offshore Technology Conference, Houston, Tex., May 2005) further showed that the magnitude of the expected CSEM response from a different offshore West Africa hydrocarbon reservoir closely matched the response predicted from a realistic three-dimensional computer model of the earth's electrical structure, when the presence of the electrically resistive hydrocarbons in the reservoir is taken into account.

Offshore controlled-source electromagnetic surveys, such as those collected using the methods disclosed in U.S. Pat. No. 6,603,313 to Srnka and U.S. Patent Publication No. 2003/0050759 published Mar. 13, 2003 (Srnka, et al.), have shown that the resistivity in the earth can be strongly dependent upon the direction of the electrical current flow used to make these measurements. In particular, the vertical electrical resistivity $\rho_V$ can be much (two or more times) larger than the horizontal electrical resistivity $\rho_H$ especially in finely layered rocks such as shales, and can vary in magnitude from location to location. This phenomenon is called electrical anisotropy, or specifically electrical vertical transverse isotropy ("EVTI") by practitioners in the art. The earth's electrical resistivity may also vary azimuthally (i.e. in the compass directions), but this anisotropic effect appears to be generally much less important (i.e. of much smaller magnitude) than EVTI in sedimentary basins of interest for hydrocarbon exploration.

The presence of EVTI distorts the signals received at seafloor electromagnetic receivers used in marine CSEM surveys acquired with a horizontal electric dipole ("HED") or a horizontal magnetic dipole ("HMD") controlled source, relative to that which would be received in the absence of EVTI. See FIG. 1 for an illustration of survey geometry suitable for the present invention. The drawing shows a survey vessel 1 towing an HED 2 and an HMD 3 over the seafloor 4 on which online receivers 6 and offline receivers 7 are arranged in a stationary array about source towline 5. This distortion affects the interpretation of marine CSEM resistivity anomalies associated with the presence of reservoired hydrocarbons such as 8. Such distortion effects appear in both the amplitude and phases of measured seafloor fields, and change with frequency. These distortions can mask the presence of hydrocarbons (false negatives) or incorrectly suggest their presence (false positives). Distortions of this kind have been observed in numerous CSEM surveys. For example, Tompkins et al., ("Effect of Vertical Anisotropy on Marine Active Source Electromagnetic Data and Inversions," EAGE 65th Annual Convention, Paris, France, abstract E025 (2004)) describe several effects of EVTI in marine CSEM data collected for hydrocarbon applications, using only (seafloor) electric field measurements. These effects include underestimating the true depth to subsurface formations such as hydrocarbon reservoirs, and underestimating their bulk resistivity, if EVTI is neglected.

Srnka (PCT Patent Publication No. WO2006/135510) teaches how to measure and analyze EVTI in marine CSEM surveys. The analysis steps disclosed therein include: (1) measurement of appropriate online and offline seafloor electric and magnetic field data, the exact combination of which depends upon the type of controlled electromagnetic source (HED or HMD) being used; and (2) mathematical inversion of the seafloor data for the electrical resistivity structure of the subsurface including the EVTI effect, using a numerical algorithm on a computer.

To utilize these principles, the CSEM source needs to produce both vertical and horizontal currents. Two types of marine CSEM sources do this, the horizontal electric dipole (HED) and the horizontal magnetic dipole (HMD). Preferred embodiments of the invention make use of particular electromagnetic field measurement data required for each of the two source types, as taught by PCT Patent Publication No. WO2006/135510. FIGS. 1, 2 and 3A-B of the present application are all reproduced from this earlier application.

In some cases the resistivity anisotropy in the subsurface region covered by the survey including the subsurface reservoir may be very small (i.e. EVTI nearly equal to unity). This can occur if the reservoir is a very uniform sandstone deposit and the subsurface region outside of the reservoir does not contain a significant volume of anisotropic shale deposits. In these few cases the CSEM responses will be approximately isotropic, which can be readily determined by analysis of the survey data as taught in the prior art. In such cases the mathematical inversion of the data can be performed by using fewer measured data components that are sensitive to the reservoir resistivity (for example, only EX online) and by using an isotropic inversion algorithm for a more efficient and economical imaging of the subsurface region.

FIG. 1 illustrates a possible data acquisition (survey) geometry for the generally anisotropic earth resistivity case (i.e. EVTI>1). A vessel 1 at or below the surface of the sea tows an HED source 2 and/or an HMD source 3 near the seafloor 4 along the source line 5, and transmits a specified waveform of electrical current as is customarily done (usually with HED source) in CSEM surveying. Alternatively, the HED and/or HMD source may be positioned in a stationary manner near or in contact with the seafloor between each pair of the individual online seafloor electromagnetic receivers 6 along line 5, while the source waveform transmission occurs. The choice of using a continuously towed and/or a stationary source depends on a variety of operational survey conditions, but primarily on the electromagnetic noise environment. Both source-generated and natural noises increase as the depth of water decreases, favoring the use of stationary sources in shallow water (typically 150 meters or less) so that very long data summation (stacking) times can be used, without lateral smearing of data, to suppress random noises. The source waveform transmission may consist of a variety of waveforms of suitable durations, such as those described in PCT Patent Publication WO2005/117326 or more generally in the previously referenced publications. The offline receivers 7 record the earth's electromagnetic response due to the source excitation, simultaneously with the response being measured by the online receivers 6. The source line, online receivers, and offline receivers are placed on the seafloor above and in the vicinity of subsurface geologic formations 8 within the earth that have been identified as potential reservoirs for hydrocarbons or other resources. The seafloor receivers are positioned at various distances from the HED or HMD source, using either uniform or nonuniform inter-receiver spacing (or both), as determined from pre-survey modeling of the anticipated seafloor responses or by operational constraints as will be well understood by practitioners of the art. Typically, the inline and cross line spacings of the receivers are from 500 to 5000 meters.

With electromagnetic data acquired as described above at a first survey time, the previously referenced PCT Patent Publication No. WO2006/135510 allows the earth resistivity values including EVTI to be determined in the region encompassed by each online and offline receiver combination of the survey, using one or more data analysis and interpretation methods. The amount, depth, and lateral distributions of any EVTI present is determined from analyses of the inline and offline field responses at the available survey frequencies; the highest frequency determining the EVTI at the shallowest depth (beginning at the seafloor and extending downward approximately one EM skin depth), and the lowest frequency providing the integrated EVTI effects from the shallowest depths to the greatest depth of effective penetration (approximately one-half of the diffusive EM wavelength, or $\pi$ times the electromagnetic skin depth). This determination allows EVTI effects to be removed from, or to be accounted for in, the seafloor CSEM data so that accurate prediction of reservoir resistivity (i.e. resistivity of a buried target reservoir formation) can be performed.

When the survey depicted in FIG. 1 is acquired at one or more later times for the purpose of determining time-dependent changes in the subsurface resistivity, the survey geometry is preferably substantially similar to that used for the survey at the first survey time so that the measured data represents the electromagnetic responses of the earth for the same subsurface regions. In practice, experience with marine CSEM surveys shows that receivers locations for surveys at a later time must be within a few tens of meters of the locations used for the first survey time, in order for the measured data to be highly reproducible. The exact distance allowable between the first and subsequently repeated receiver locations depends on the subsurface electrical parameters and upon the source frequencies used to probe the earth structure. Typically, the allowable distance is less than 100 meters for probing frequencies of 0.25 Hertz for a reservoir at 1500 meters below the seafloor with an earth background horizontal resistivity of 1.0 Ohm-m and an EVTI=2.0.

The individual data processing steps applied in the present inventive method to the inline and offline electric and magnetic field data, both at the first survey time and at the one or more later survey times, are standard procedures used by practitioners of offshore CSEM surveys and described in the prior art including publications referenced herein. Several additional steps may be advisable to prepare the measured data acquired at the first and later survey times for mathematical inversion, depending on the quality, spatial coverage, and other aspects of the data (step 62 in the flow chart of FIG. 6). These additional steps may include: noise suppression using muting or filtering in the source-receiver offset domain, phase adjustments to account for bulk shifts due to timing errors, amplitude adjustments to account for inconsistencies between components and data summations to produce larger effective apertures (see, for example, U.S. Patent Pub. No. 2003/0050759A1).

In the previously referenced 2005 SEG paper, Srnka discloses that the resistivity of a sub-sea reservoir can be imaged using CSEM data input to a three-dimensional (3D) inversion algorithm operating on a computer, in which a priori constraints can be applied and the absolute values of subsurface resistivity are determined. Thompson, et al. ("Sensitivity to hydrocarbon targets using marine active source EM sounding: Diffusive EM imaging methods", EAGE Annual Meeting, Paris, June 2004) show an example of approximate imaging of marine CSEM data using a two-dimensional (2D) computer algorithm that estimates only the relative resistivity contrasts between earth electrical structures, rather than determining the absolute resistivity values as is done using nonlinear inversion. Carazzone, et al. ("Three dimensional imaging of marine CSEM data", *Extended Abstract*, EM 3.3, SEG Annual Meeting, Houston, Tex., November 2005) show several examples of 3D marine CSEM nonlinear data inversions that matched approximately the reservoir resistivity values measured by induction well logs in the reservoirs. However, none of these inversion examples discuss the incorporation of EVTI in the results, nor do they discuss imaging time-dependent changes in reservoir resistivity.

The inversion methods of this invention for data acquired at each survey time include, but are not restricted to, the four complementary approaches disclosed in PCT Patent Publication No. WO2006/135510, which are summarized in the following paragraphs. At step 63 of the flow chart of FIG. 6, an inversion method is selected.

(1) (Step 64) Iterative 1D, 2D, and/or 3D forward modeling on a digital computer using algorithms for isotropic earth calculations, well known to practitioners of the art including those referenced herein, in which the actual data (amplitudes and/or phases) are compared with the model responses (amplitudes and/or phases), and the model is subsequently adjusted so as to match the actual field data with the modeled responses. In this isotropic interpretation method, if HED data are to be used, the online responses are modeled using the vertical electrical resistivity, and the offline responses are modeled using the horizontal resistivity, and the reverse if HMD data are to be used. (See Table 1 below.) Iterative adjustments to the vertical resistivity model are made by comparing to measured data for an EM field component that is sensitive preferably only but at least predominantly to vertical resistivity, and correspondingly for the horizontal resistivity model. Where offline data are used, the data are preferably from receivers exactly broadside to the source (i.e., at x=0 in FIG. 1). The ratio of the online to the offline model results (resistivity versus depth z and location x, y) then provides an approximate value of earth resistivity including EVTI as a function of depth and position.

(2) (Step 65) Iterative 1D, 2D, and/or 3D forward modeling on a digital computer using algorithms for anisotropic earth calculations that include EVTI, well known to practitioners of the art including the previously referenced paper by Yin and Maurer, in which the actual data (amplitudes and/or phases) are compared with the model responses (amplitudes and/or phases), and the model is subsequently adjusted so as to match the actual field data with the modeled responses. In this anisotropic interpretation method, the online and offline responses are simultaneously modeled using estimates of both vertical and horizontal resistivity. The final model solution then contains the earth resistivities and EVTI value (amount) as a function of both depth and lateral position.

(3) (Step 66) Automated 1D, 2D, and/or 3D mathematical inversion (imaging) on a digital computer using isotropic resistivity algorithms well known to practitioners of the art (see, for example, Newman et al., *Three Dimensional Electromagnetics* (Oristaglio and Spies, eds.) Soc. Expl. Geophysicists, Tulsa, 299-321 (1999)). In one embodiment of this isotropic inversion method, $E_x$ online and $E_z$ online for an HED source (or $H_x$ online and $H_y$ offline for an HMD source), and the offline $H_z$ for an HED source (or $H_z$ online for an HMD source), are input separately into the inversion program which then uses numerical optimization algorithms to separately solve for the amount, depth, and lateral distribution of horizontal and vertical resistivities whose electromagnetic responses best fit the observed seafloor data. The EVTI is then found by subsequently forming the ratio of the inverted vertical to horizontal resistivity at each depth and location. As with isotropic forward modeling, a key is that one inversion solution uses electromagnetic field data that are more sensitive to vertical resistivity, while the other inversion solution uses data that are more sensitive to horizontal resistivity.

(4) (Step 67) Automated mathematical inversion (imaging) programs on a digital computer using anisotropic 1D resistivity algorithms (see, for example, the previously referenced paper by Tompkins, et al.), and anisotropic extensions of 2D and 3D frequency-domain and time-domain finite difference algorithms previously developed by practitioners of the art (see, for example, Weiss, et al., *Geophysics* 67, 1104-1114 (2002); and Weiss, et al., *Geophysics* 68, 922-930 (2003)). In this anisotropic inversion method, the online and offline responses are input jointly into the inversion program which then uses numerical optimization algorithms to solve for the amount, depth, and lateral distribution of horizontal and vertical resistivities whose electromagnetic responses best fit the observed seafloor data.

The isotropic approaches require two separate computer runs of either the iterative forward modeling program or the inversion program. One run involves data for at least one electromagnetic field component sensitive preferably only but at least predominantly to horizontal resistivity, and the output is an horizontal resistivity data volume. The other run involves data for at least one EM field component sensitive preferably only but at least predominantly to vertical resistivity, and the output is a vertical resistivity data volume. The anisotropic approaches input all data into a single run. The data can be for field components that are sensitive to both vertical and horizontal resistivity; however, the method produces more mathematically robust results if the data include a component sensitive only to vertical resistivity and another sensitive only to horizontal resistivity. Thus, a preferred electromagnetic data set for one approach will be a preferred set for all approaches (for a given source type). Table 1 lists sensitivity to vertical resistivity $\rho_v$ and to horizontal resistivity $\rho_H$, or both, for both HED and HMD source types, and for online and offline receiver location. (Preferred offline data are from locations broadside to the source.) The entries in Table 1 of most interest for the present invention are those for which the data depend at least predominantly on either $\rho_v$ or $\rho_H$. It can be seen from Table 1 and the preceding description of the method that all of the preferred embodiments of the invention require online measurement of at least one EM field component and offline measurement of at least one EM field component. Additional data provide the expected data redundancy benefits. In Table 1, sensitivity labeled "only" to $\rho_v$ or $\rho_H$ assumes a flat-layered earth model, and it must be recognized that in actual situations such sensitivity will not be quite so pure. It must be recognized that Table 1 applies to offshore environments. Table 1 would be changed considerably for on-land applications.

TABLE 1

Marine CSEM Data - EVTI Responses

| Source | Receiver Location | Data | $\rho_v/\rho_h$ Resistivity Sensitivity |
|---|---|---|---|
| HED | Online | $E_x$ | both (predominantly $\rho_v$) |
| " | " | $H_y$ | both (predominantly $\rho_v$) |
| " | " | $E_z$ | only $\rho_v$ |
| " | " | $E_y, H_x, H_z$ | are theoretically = 0 |
| HED | Offline | $E_x$ | both (predominantly $\rho_h$) |
| " | " | $H_y$ | both (predominantly $\rho_h$) |
| " | " | $H_z$ | only $\rho_h$ |
| " | " | $E_y, E_z, H_x$ | both (mixed $\rho_v$ and $\rho_h$) |
| HMD | Online | $E_y$ | both (predominantly $\rho_h$) |
| " | " | $H_x$ | both (predominantly $\rho_h$) |
| " | " | $H_z$ | only $\rho_h$ |
| " | " | $E_x, E_z, H_y$ | are theoretically = 0 |

TABLE 1-continued

Marine CSEM Data - EVTI Responses

| Source | Receiver Location | Data | $\rho_v/\rho_h$ Resistivity Sensitivity |
|---|---|---|---|
| HMD | Offline | $E_y$ | both (predominantly $\rho_v$) |
| " | " | $H_x$ | both (predominantly $\rho_v$) |
| " | " | $E_z$ | only $\rho_v$ |
| " | " | $E_x, H_y, H_z$ | both (mixed $\rho_v$ and $\rho_h$) |

The skilled practitioner will readily recognize that all of the above approaches, whether isotropic or anisotropic, forward modeling or inversion, involve solving Maxwell's electromagnetic field equations by computer-assisted numerical methods. With the source acquisition parameters all known, along with the background resistivities (salt water, etc.), and measured data for at least two EM field components, the only unknown is target resistivity and it can be solved for.

The iterative forward modeling approaches will typically be computer implemented, but typically require manual guidance. The data interpreter typically inputs known or estimated resistivity parameters into a starting depth model. Such a model might include among other parameters the seawater depth, water resistivity and its vertical gradient, the resistivity of the air, and a first guess at the resistivity of the earth based on prior knowledge (e.g., well logs from a similar area), associated data (e.g. seismic velocities converted to resistivity through a statistical relationship), and general experience in the technology. Often a uniform background resistivity value is chosen. The primary effect of the initial resistivity model is to speed or delay convergence. The model is then run on a computer using an algorithm that solves Maxwell's equations for the chosen input values, and as a result synthetic data are obtained for the survey configuration corresponding to the real data. The interpreter then compares the synthetic and real data at several locations, and based on available knowledge of the expected response, and modifies the resistivity in the model so as to bring the synthetic data closer to the real data. The process is typically repeated a number of times until criteria set by the interpreter are met, i.e. the final resistivity-depth model's synthetic data match the real data within some accepted limit. If the process is not converging, this typically means that the geology is complex requiring that more frequencies, source-to-receiver distances, and E or H components need to be examined, or that the measured data are somehow corrupted.

In the inversion approaches, the data interpreter builds a starting resistivity depth model, using known values (seawater, air, etc.) and a starting guess for the earth resistivity often taken as uniform and representative of the area as determined by experience, nearby values, as described above for forward modeling approaches. The real data are then input into a computer algorithm along with the starting resistivity model, and the algorithm generates synthetic data by solving Maxwell's equations, which is typically done by numerical, iterative schemes well known in the art. In preferred embodiments of the invention, the algorithm uses mathematical techniques, such as derived gradients in the differences between real and synthetic data, to find changes in the model that will result in minimizing the misfit between the real and synthetic data in the next iteration of the process. The computer algorithm is capable of handling much more complexity in the data and model than a human interpreter, and is allowed to continue to operate its internal iterative processes until the misfit between real and synthetic data reaches some preset small value. At this point the mathematical answer is said to have converged to an optimal solution, which corresponds to a final resistivity-depth model that best represents the real earth resistivity structure including any hydrocarbons that are present.

A user of the present invention might, for example, select (step 63 of FIG. 6) an embodiment in which both iterative modeling and inversion in the frequency domain as described herein are used, but limited to anisotropic computer programs and algorithms, to provide cross-checking of EVTI results (step 68) and also to better incorporate the interpreter's geologic knowledge. The data selected might, for example, have been acquired using an HED controlled source that is either towed near the seafloor (preferably between 25 and 50 meters) or is placed in stationary positions on the seafloor between consecutive pairs of seafloor receivers along the source line. In such a case, only online $E_x$ and $E_z$ electric field responses are needed, measured simultaneously with only the offline $H_z$ responses, at a variety of online and offline ranges, typically zero (0) to 12,000 meters online and one (1) to 8,000 meters offline for an HED strength (dipole moment) of 300,000 Ampere-meters. Practitioners of the art will understand that the choice of online and cross line (offline) ranges, i.e., source-to-receiver distances, for these response measurements depend on the source strength and frequencies used in the survey, which in turn depend on the expected horizontal and vertical resistivities of the earth and the depth to the target(s) of interest.

An alternative to the Table 1 options for a field component measurement sensitive only to horizontal resistivity exists in the form of passive source electromagnetic measurements. Measuring electromagnetic response in the absence of a man-operated source is a known technique called magnetotelluric ("MT") surveying. The published literature discloses how to measure the earth's resistivity below the seafloor using the passive-source marine magnetotelluric ("MMT") method (Constable et al., *Geophysics* 63, 816-825 (1998); Hoversten et al., *Geophysics* 65, 1476-1488 (2000)). The energy source for magnetotellurics is the natural fluctuations in the Earth's ambient magnetic field, due primarily to ionospheric functions and lightning. MMT measurements are typically confined to horizontal electric and magnetic fields ($E_x$, $E_y$, $H_x$, $H_y$), although vertical electric field ($E_z$) data is sometimes useful for estimating lateral variations in geological structures (Zhdanov and Wan, "Three-dimensional marine magnetotellurics for petroleum exploration", *SEG 2003 Annual Meeting Expanded Abstracts*, 537-540 (2003)). Analyses of these data yield information almost entirely limited to the horizontal resistivity.

The inversion calculation is performed for an initial survey and (step 61 of FIG. 6), and for at least one survey performed later in time (step 72).

Mathematical inversion of marine CSEM data provides a means to map the resistivity at depth from relatively low-cost measurements obtained remotely at or near the seafloor. Such a resistivity map can then be used to estimate the hydrocarbon saturation throughout the reservoir rock, using empirical relationships that connect resistivity to saturation such as Archie's law (Archie, *Trans. American Inst. Mech. Eng.* 146, 54-62 (1942)). Estimates of rock and brine properties from seismic and well data and other means such as rock physics models can be used to calibrate or improve the inversions.

It is well known by practitioners of the art that electrical resistivity is a sensitive measure of fluid content in porous rocks such as subsurface hydrocarbon reservoirs (Keller and Frischnecht, *Electrical Methods in Geophysical Prospecting*, 20-33, Pergamon (1966). The bulk isotropic electrical resistivity of a water-wet rock is usually described by the empirical mathematical relation known as Archie's law:

$$\rho_r = \rho_w (1-S_{hc})^{-m} \cdot \Phi^{-m} \qquad (1)$$

where $\rho_r$ is the bulk rock resistivity, $\rho_w$ is the resistivity of the brine in the rock, $S_{hc}$ is the hydrocarbon saturation, $\Phi$ is the porosity, and m is a empirical exponent which usually has a value near m=2 and represents the rock matrix. Equation (1) models the rapid decrease in bulk reservoir resistivity as the hydrocarbon saturation decreases, for a given rock porosity and brine resistivity. As a hydrocarbon reservoir is produced, the reservoir porosity is essentially constant unless the reservoir rock is altered inadvertently during production, for example by diagenetic processes such as clay growths. The reservoir could also be altered intentionally by chemical or pressure-fracturing processes used to stimulate production. Information on bulk rock density can be obtained from seismic reflection data to subsequently estimate such changes in porosity. The resistivity of the reservoir brine that wets the pore surfaces is also approximately constant during hydrocarbon production from most reservoirs, unless water or some water-soluble fluid is artificially injected into the reservoir to stimulate production. Therefore if the pore spaces contain primarily hydrocarbon fluids and brine, local changes in bulk resistivity can be a direct measure of local changes in the hydrocarbon saturation $S_{hc}$. If $\rho_{r0}$ is the local bulk resistivity and $S_{hc0}$ is the local hydrocarbon saturation at an initial time $t_0$, and $\rho_{r1}$ is the local bulk resistivity and $S_{hc1}$ is the local hydrocarbon saturation at a later time $t_1$, then substituting these values into Equation (1) gives:

$$S_{hc1} = 1 - (1 - S_{hc0}) \cdot (\rho_{r1}/\rho_{r0})^{-m} \quad (2)$$

Equation (2) provides a simple means to estimate the change in $S_{hc}$ once the initial properties of the reservoir are determined. If another electrically resistive fluid is introduced into the reservoir, such as carbon dioxide ($CO_2$) for production stimulation or for carbon sequestration, the direct relationship between $S_{hc}$ and $\rho_r$ breaks down and a more complicated method must be used to estimate $S_{hc}$ (Hoversten et al., "Pressure and fluid saturation prediction in a multi-component reservoir using combined seismic and electromagnetic imaging", *Geophysics* 68, 1580-1591 (2003)).

EXAMPLES

Figure 2:
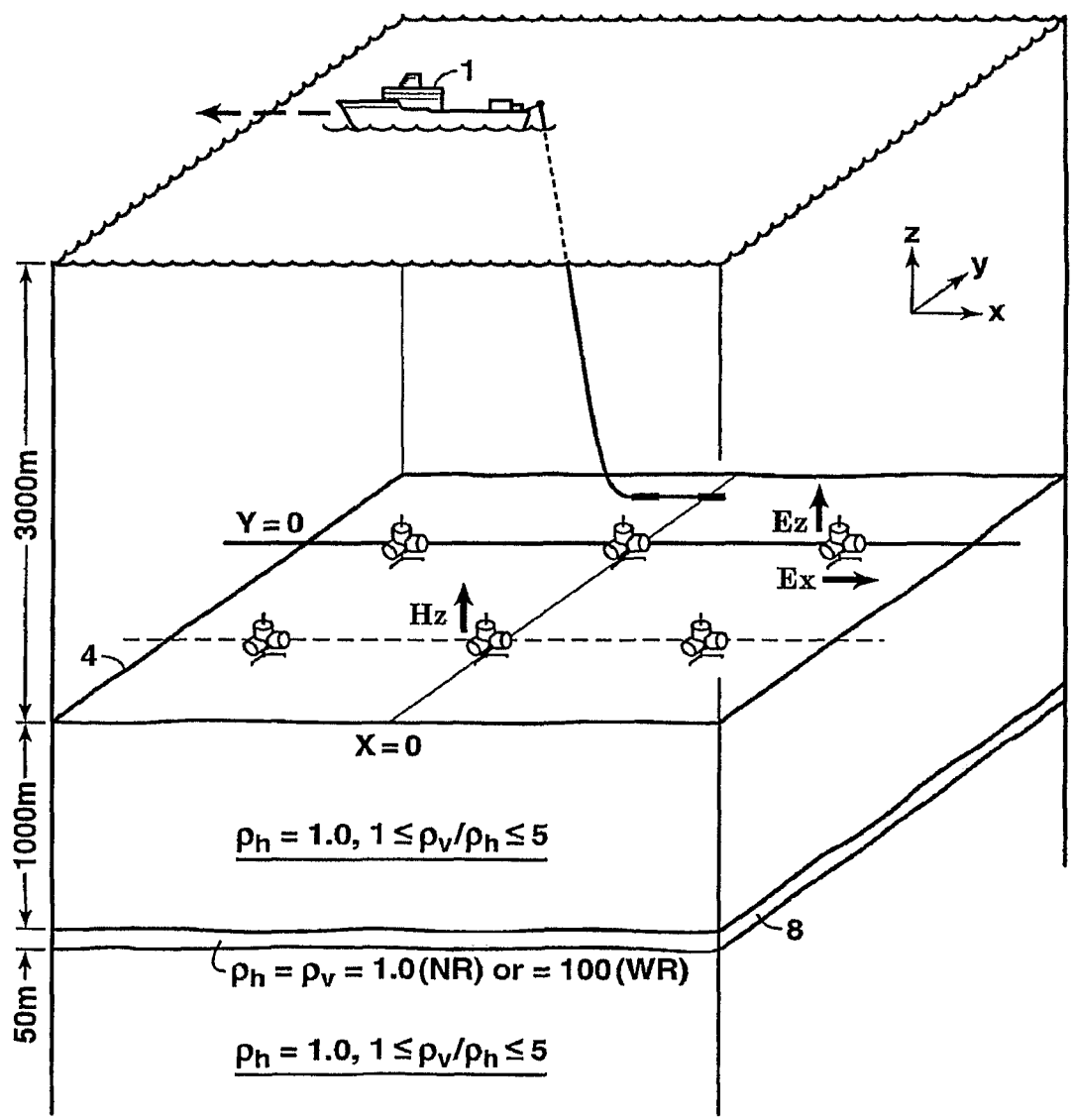
FIG. 2 illustrates a survey geometry and a subsurface resistivity model for a model calculation to provide a test example of the present inventive method.
Figure 3A:
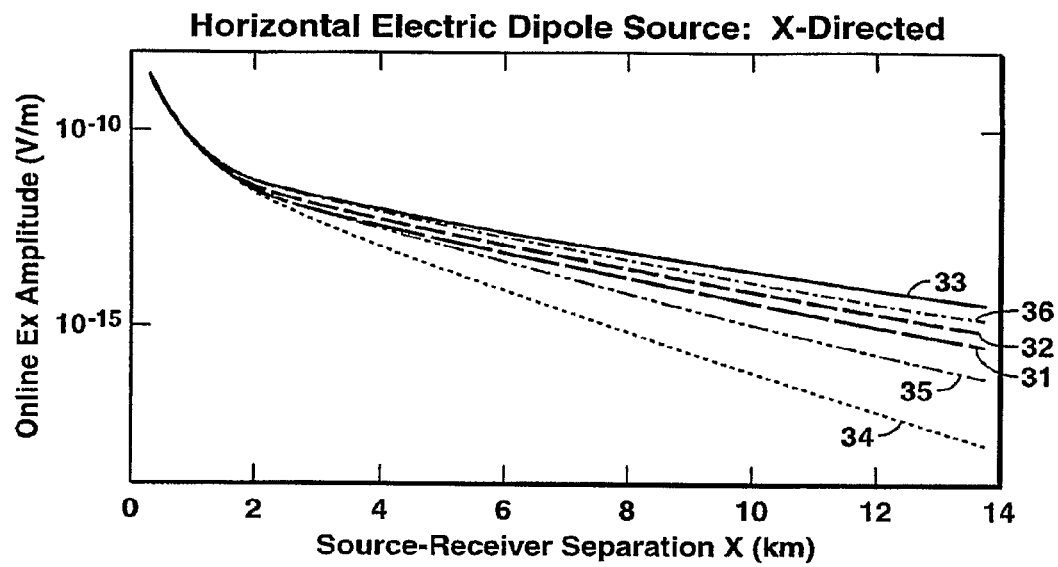
FIG. 3A shows online $E_x$ amplitude and FIG. 3B shows $E_x$ phase for an HED source and for varying values of EVTI, with and without a resistive layer in the model of FIG. 2.
Figure 3B:
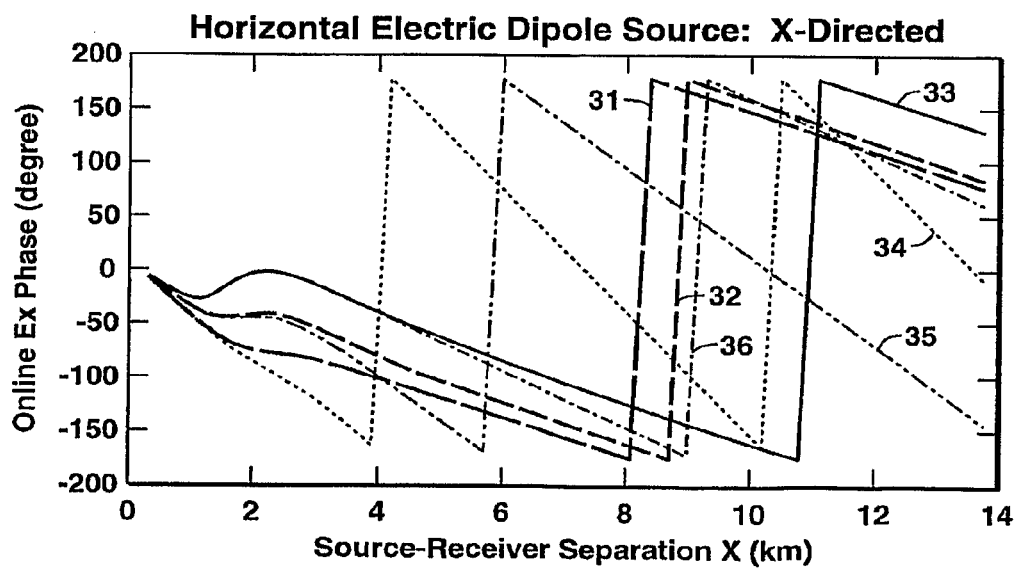

In lieu of actual CSEM data of the type and combination required in this invention, numerical calculations that employ 1D methods well known to practitioners of the art are used herein to demonstrate the seafloor electromagnetic responses utilized by the invention. FIG. 2 shows the survey geometry and 1D resistivity model used for this model calculation of CSEM response data. The equipment layout is the same as in FIG. 1 (and the same reference numbers apply), except only an HED source is used. The model for this example uses a seawater depth of 3000 meters and a 50 meter thick simulated hydrocarbon reservoir 8 whose top is buried 1000 meters below the seafloor. FIGS. 3A and 3B show the calculated changes in the HED source-normalized (i.e., responses for a unit dipole of length one meter and current of one Ampere) online $E_x$ seafloor field amplitudes in volts/meter (FIG. 3A) and the absolute phases (FIG. 3B) caused by EVTI of varying magnitudes (1:1 to 5:1 EVTI ratio $\rho_v:\rho_h$, where $\rho_v$ is the vertical resistivity and $\rho_h$ is the horizontal resistivity), corresponding to the survey geometry and earth parameters of FIG. 2 for a sinusoidal source frequency of 0.25 Hertz. The anisotropy is typically found in the earth above and below the hydrocarbon layer, and can be present within the hydrocarbon layer if, for example, the reservoir is stratified. But unless the hydrocarbon layer is thick enough to be resolved by the electromagnetic data, its EVTI effect is not large enough to be visible in these model data, and so the reservoir is assumed to have isotropic resistivity for the purpose of these simulations. The HED is aligned in the x-direction (sometimes referred to as an XED source). (It is typical in marine CSEM practice to align an HED source, which is basically a long wire, with the direction in which it is being towed, this being the orientation it will naturally tend to assume when towed by a cable connected to one end.) The horizontal resistivity $\rho_h$ is set at 1.0 Ohm-m for this calculation. The horizontal axis is the distance x along the source line, measured in terms of the distance of the moving source from a particular online receiver, i.e., one of the receivers 6 located along the source towline 5 (see FIG. 1). Practitioners of the art will understand that other values of the input parameters could be used equally well in this illustration. The reservoir layer 8 is assumed to have resistivity of 100 Ohm-m (electrically isotropic, EVTI=1). Six curves display seafloor receiver responses for various cases of either the reservoir 8 present or not present, and for varying values of overburden and underburden EVTI. In FIGS. 3A-B, the second digit in the reference number denotes the EVTI value and whether the reservoir layer is present ("WR") in the model or not present ("NR") according to the following key: 1 denotes EVTI=$\rho_v/\rho_h$=1, WR; 2 denotes EVTI=2, WR; 3 denotes EVTI=5, WR; 4 denotes EVTI=1, NR; 5 denotes EVTI=2, NR; and 6 denotes EVTI=5, NR. It can be seen that as the EVTI effect increases, the presence or absence of the target layer makes progressively less difference, which illustrates the need for the present invention when determining changes in the properties of the reservoir.

Figure 4:
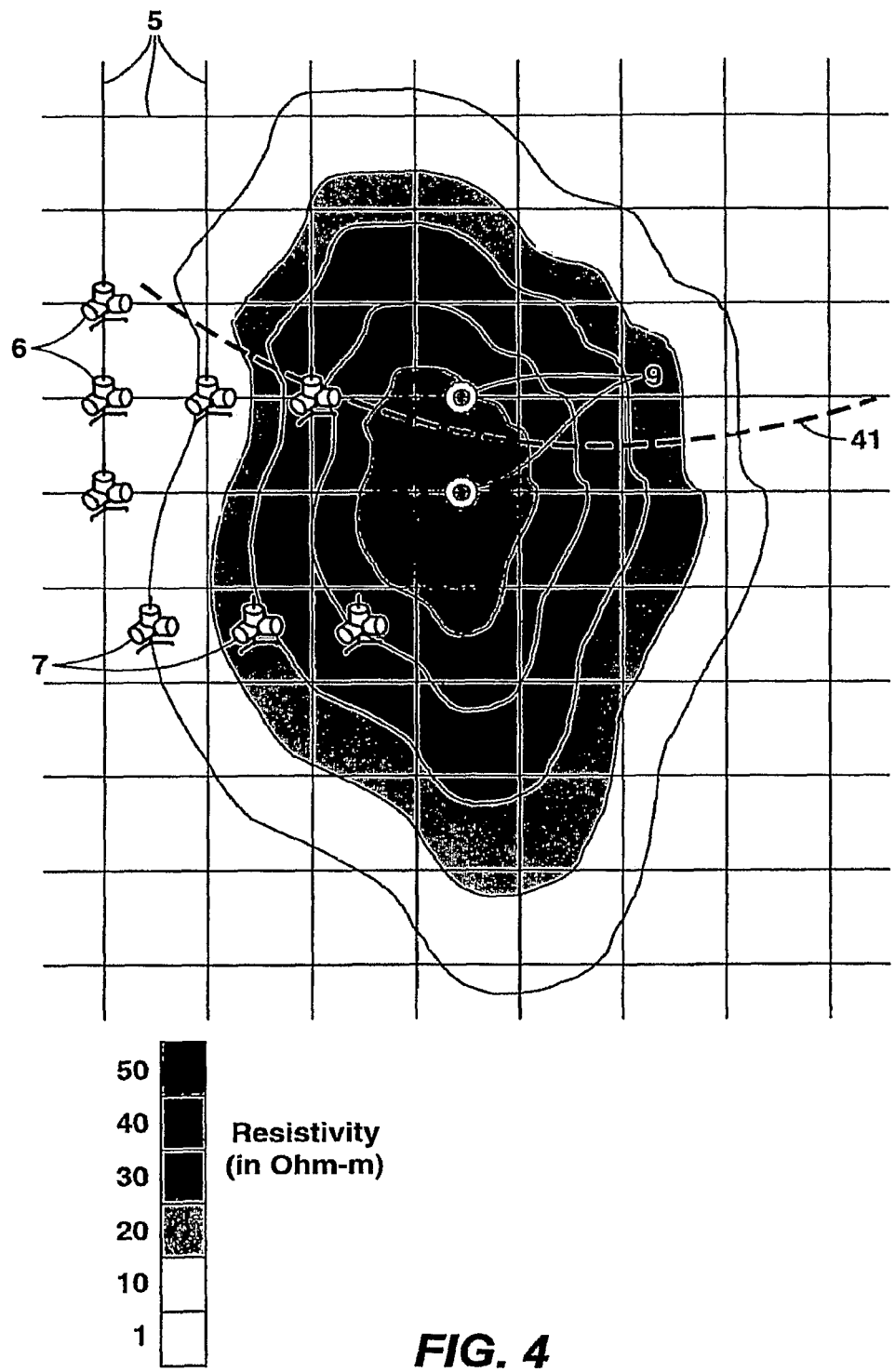
FIG. 4 illustrates a simulated depth image of the vertical resistivity of a model subsurface hydrocarbon reservoir, averaged over the reservoir thickness, obtained by 3D inversion of online $E_x$ and offline $H_z$ seafloor electromagnetic data obtained at an initial time in the survey geometry shown in FIG. 2.
Figure 5:
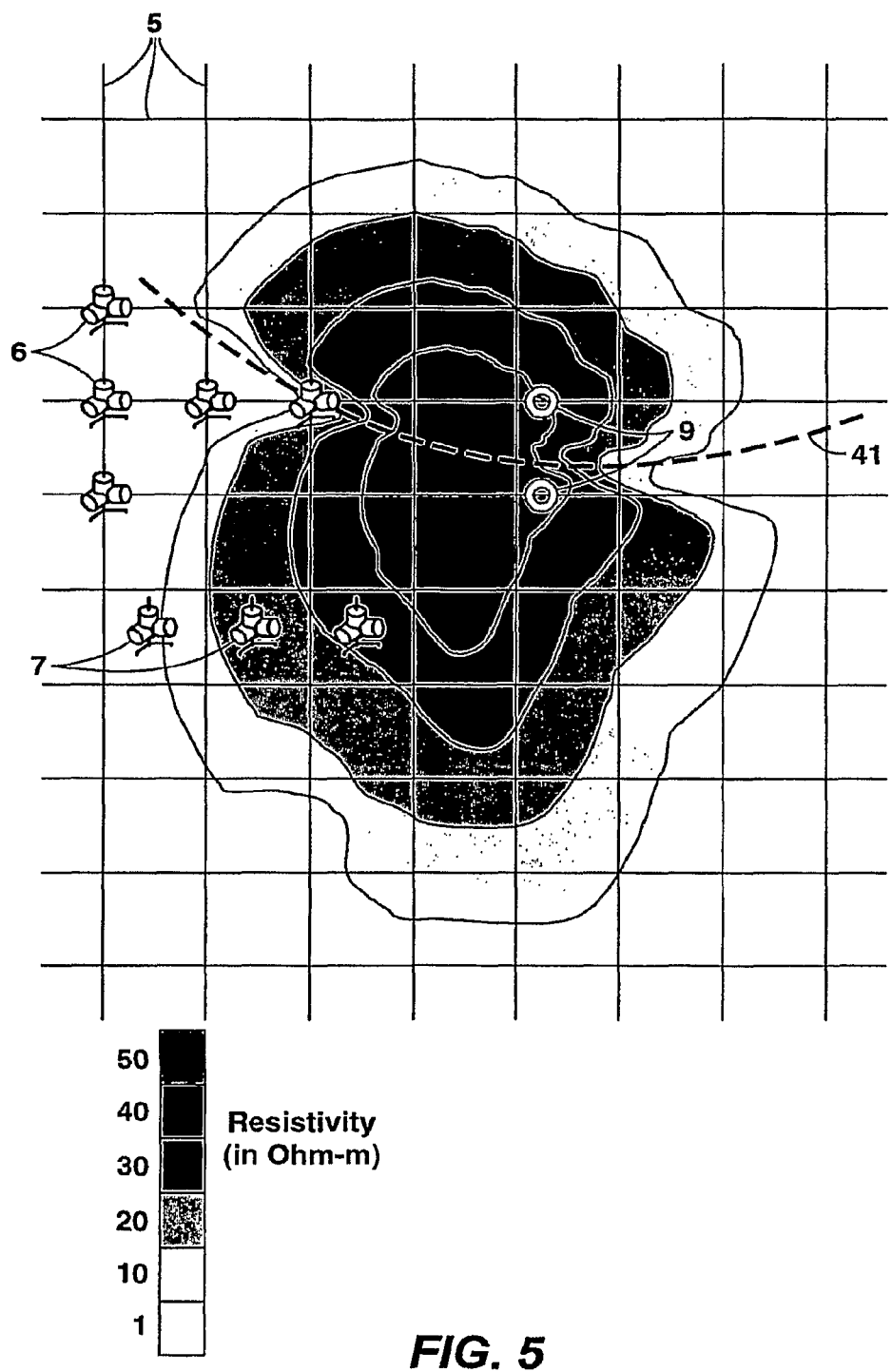
FIG. 5 illustrates a simulated depth image of the vertical resistivity of a model subsurface hydrocarbon reservoir, averaged over the reservoir thickness, obtained by 3D inversion of online $E_x$ and offline $H_z$ seafloor electromagnetic data obtained at a later time in the survey geometry shown in FIG. 2, in which the seafloor measurements are acquired at the same locations using the same source lines as at the first time.
Figure 6:
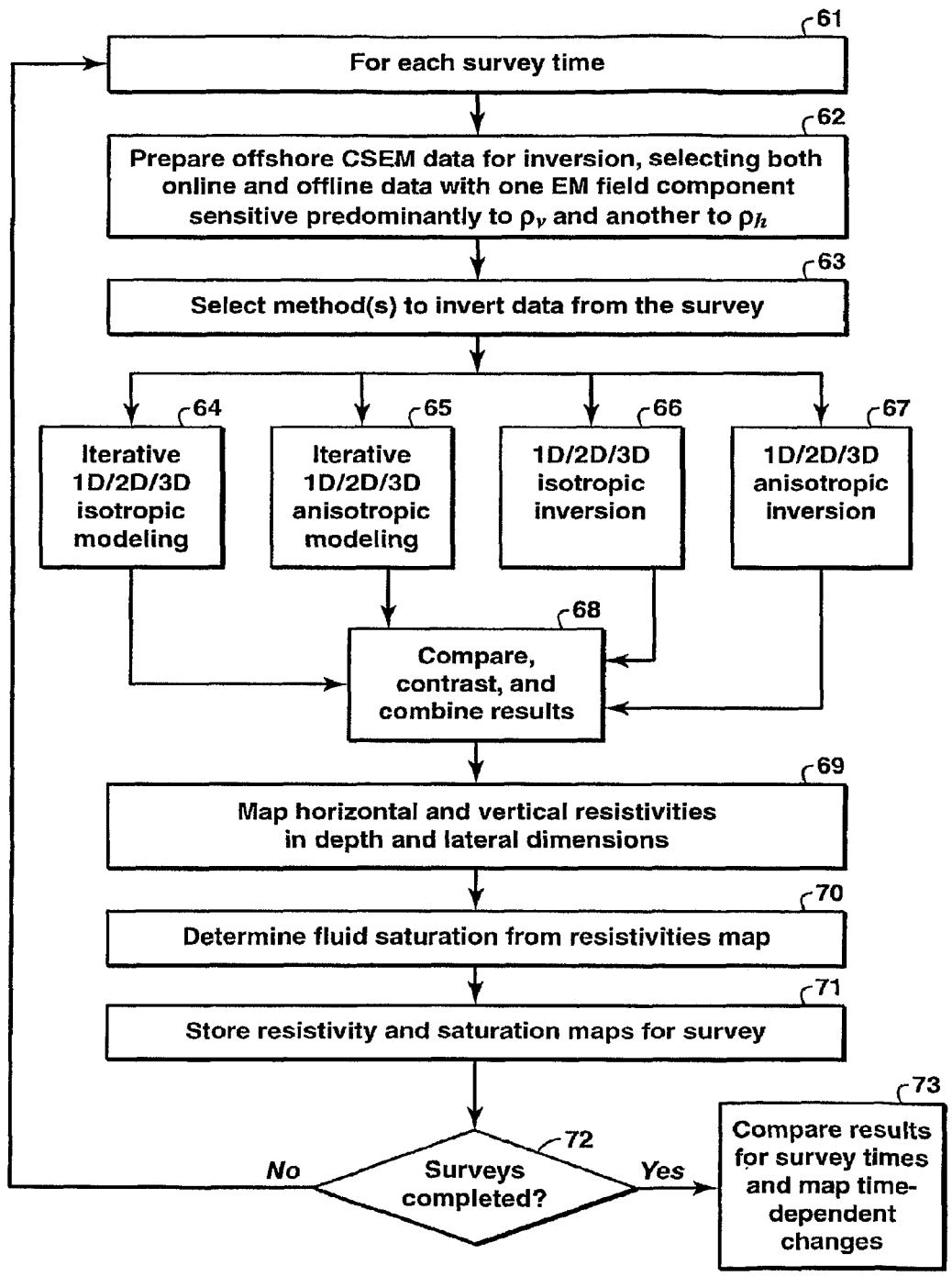
FIG. 6 is a flow chart showing the basic steps in one embodiment of the present inventive method.

FIGS. 4 and 5 are horizontal slices from a 3D depth map such as can be prepared (by inverting data associated with different frequencies) as indicated in step 69 of FIG. 6. FIG. 4 shows a simulated 3D anisotropic inversion of online and offline data collected at an initial time using the survey geometry of FIG. 2 over a subsurface hydrocarbon reservoir. Neither FIG. 4 nor 5 was prepared by actual data inversion; they are merely illustrations intended to indicate the types of resistivity maps [69] and time-dependent comparisons [73] that could be made using the present inventive method. Unlike the simple uniform-layer model case shown in FIGS. 1 and 2, here the hydrocarbon saturation and pay zone thicknesses vary within the reservoir layer, due to its geologic structure and internal properties, so that the reservoir resistivity varies laterally. Locations of simulated wells 9 for producing the hydrocarbons are shown. The contours depict the values of the inverted vertical resistivity averaged over the 50 meter gross thickness of the reservoir (numerical values in units of Ohm-m are indicated by the gray scale reference bar) measured independently from seismic and well data. The average vertical resistivity is typically the most robust parameter in such inversions. To good first approximation the collected online and offline data are primarily sensitive to the vertical thickness-resistivity product at the reservoir depth. In this simulation, a zone of high fluid permeability is indicated by the dashed line 41. Other reference numbers have the same meaning as in FIG. 1.

FIG. 5 shows a simulated 3D anisotropic inversion of online and offline data collected at a time later than that shown for the results in FIG. 4, again using the survey geometry of FIG. 2. In this simulated result, the source and receiver locations for the later time survey are shown at exactly the same positions as for the initial time survey. In practice, small errors can be introduced into the subsurface resistivity inversion for the later survey(s) if the source and receiver locations are too far from those used in the initial time survey, e.g. greater than 100 meters.

The contours in FIG. 5 depict the values of the inverted vertical resistivity averaged over the 50 meter thickness of the reservoir, corresponding to the measured seafloor CSEM data measured at the later time. In the simulated result, the average vertical resistivity within the model reservoir is reduced substantially near the zone of high fluid permeability (i.e. the darker areas have contracted in size), as would be expected in an actual reservoir as the average local resistivity is reduced by the displacement of electrically resistive hydrocarbons. Depending upon the actual values of rock porosity, permeability, and initial fluid saturation of an actual reservoir and the hydrocarbon production rates from the two wells, the time between the first resistivity image (FIG. 4) and the second resistivity image in FIG. 5 could typically be 3 to 10 years.

It will be clear from the description of this invention that the repeat surveys can be acquired at a variety of times following the initial time survey, depending upon the expected production rates, and the resistivity inversion performed appropriately for one or more later times and then compared with inversions for the initial time or with resistivity inversions for one or more later times of said surveys.

An embodiment of the present invention further uses the inverted resistivity values at the initial time 1 and at the at least one later time 2 to estimate (step 70 of FIG. 6) the average hydrocarbon saturations $S_{hc1}$ and $S_{hc2}$ at these two times, and then to map (step 71) and analyze (step 73) the time-dependent change in saturation $\Delta S_{hc}=(S_{hc1}-S_{hc2})$ within the reservoir area. The conversion from resistivity to fluid saturation is well known to practioners of the art, and can be performed in a number of ways described in the prior art including the use of empirical relationships such as Archie's law calibrated by measurements of reservoir porosity and water saturation measured by well logs.

Either frequency-domain or time-domain techniques may be used for data acquisition, processing, analysis, and interpretation in practicing the present inventive method. The choice between time-domain and frequency-domain techniques is largely determined by operational considerations (such as water depth) that are well understood by practitioners of the art. The sources, seafloor instruments, and electric and magnetic field sensors required for the measured seafloor data used in this invention are also well known to practitioners of offshore CSEM surveys. The instruments and sensors were developed originally for offshore magnetotelluric surveys (Chave et al., "Electrical Exploration Methods for the Seafloor," *Electromagnetic Methods in Applied Geophysics*, 2, 931-966, Society of. Exploration Geophysicists, Tulsa (1991)).

The foregoing application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims.

The invention claimed is:

1. A method for determining time-dependent changes in the hydrocarbon content of a subsurface reservoir from controlled-source electromagnetic survey data obtained from the subsurface region containing the reservoir, said method comprising:

(a) obtaining electromagnetic field data recorded at a plurality of online and offline, relative to a survey source line, receiver locations from an initial survey of the subsurface region, and corresponding survey results from at least one later survey of the same region conducted under substantially the same conditions, said data comprising a combination of field component and receiver location sensitive at least predominantly to vertical resistivity and a combination of field component and receiver location sensitive at least predominantly to horizontal resistivity, wherein each said combination depends on electromagnetic source design;

(b) for each survey, using a transitory, non-human computing apparatus to solve Maxwell's electromagnetic field equations for horizontal resistivity and vertical resistivity at a plurality of (x,y,z) positions in the subsurface reservoir, using survey acquisition parameters and the measured electromagnetic field data; and (c) comparing calculated resistivity results between the surveys.

2. The method of claim 1, further comprising, after calculating horizontal and vertical resistivities:

calculating fluid saturation values from the calculated horizontal and vertical resistivities.

3. The method of claim 2, wherein the fluid saturation calculation uses Archie's law.

4. The method of claim 1, wherein degree of duplication of survey geometry from one survey to another depends upon subsurface electrical parameters and upon the controlled source's frequency spectrum.

5. The method of claim 4, wherein receiver locations from one survey to another vary by no more than 100 meters.

6. The method of claim 1, wherein the survey data come from surveys using a horizontal electric dipole electromagnetic source.

7. The method of claim 6, wherein the field component sensitive at least predominantly to vertical resistivity is online $E_z$, vertical component of electric field, and the field component sensitive at least predominantly to horizontal resistivity is offline $H_z$, vertical component of magnetic field.

8. The method of claim 1, wherein the survey data come from surveys using a horizontal magnetic dipole electromagnetic source.

9. The method of claim 8, wherein the field component sensitive at least predominantly to vertical resistivity is offline $E_z$, the vertical component of electric field, and the field component sensitive at least predominantly to horizontal resistivity is online $H_z$, the vertical component of magnetic field.

10. The method of claim 1, wherein the electromagnetic data comprise $H_z$ data, where z represents the vertical direction and $H_z$ is the vertical component of magnetic field.

11. The method of claim 1, wherein the electromagnetic field equations are solved for electromagnetic field component values using an assumed resistivity model of the subsurface region and space above it, comparing the calculated values of field components to measured values, adjusting the model's resistivity values to compensate for any differences, and repeating the process until agreement is obtained within a predetermined criterion.

12. The method of claim 11, wherein the model is isotropic, i.e., resistivity independent of current flow direction, and the model is run twice each iteration, once assuming only horizontal resistivity, i.e., vertical resistivity=0, and once assuming only vertical resistivity, i.e., horizontal resistivity=0.

13. The method of claim 12, wherein the electromagnetic source is a horizontal electric dipole, and the model assuming only vertical resistivity is run using online $E_z$ data and the model assuming only horizontal resistivity is run using offline $H_z$ data, wherein $E_z$ is the vertical component of electric field and $H_z$ is the vertical component of magnetic field.

14. The method of claim 12, wherein the electromagnetic source is a horizontal magnetic dipole, and the model assuming only vertical resistivity is run using offline $E_z$ data and the model assuming only horizontal resistivity is run using online $H_z$ data, wherein $E_z$ is the vertical component of electric field and $H_z$ is the vertical component of magnetic field.

15. The method of claim 11, wherein the model is anisotropic, i.e., resistivity depends on current flow direction, and the model is run once each iteration.

16. The method of claim 1, wherein the electromagnetic field equations are solved using the measured field responses as known quantities and inverting the field equations by an iterative numerical method to converge on a resistivity model of the subsurface region.

17. The method of claim 16, wherein the resistivity model is assumed to be isotropic.

18. The method of claim 16, wherein the resistivity model is assumed to be anisotropic.

19. The method of claim 16, wherein the electromagnetic source is a horizontal electric dipole and the electromagnetic field data comprise online $E_z$ and offline $H_z$ data, wherein $E_z$ is the vertical component of electric field and $H_z$ is the vertical component of magnetic field.

20. The method of claim 16, wherein the electromagnetic source is a horizontal magnetic dipole and the electromagnetic data comprise online $H_z$ data and offline $E_z$ data, wherein $E_z$ is the vertical component of electric field and $H_z$ is the vertical component of magnetic field.

21. A method for producing hydrocarbons from a reservoir in a subsurface region, comprising:
(a) obtaining electromagnetic field data recorded at a plurality of online and offline, relative to a survey source line, receiver locations from an initial survey of the subsurface region, and corresponding survey results from at least one later survey of the same region conducted under substantially the same conditions, said data comprising a combination of field component and receiver location sensitive at least predominantly to vertical resistivity and a combination of field component and receiver location sensitive at least predominantly to horizontal resistivity, wherein each said combination depends on electromagnetic source design;
(b) for each survey, obtaining solutions of Maxwell's electromagnetic field equations for horizontal resistivity and vertical resistivity at a plurality of (x,y,z) positions in the subsurface reservoir, using survey acquisition parameters and the measured electromagnetic field data;
(c) obtaining comparisons of calculated resistivity results between the surveys; and
(d) producing hydrocarbons from the reservoir using resistivity differences between surveys to make reservoir management and development decisions.

22. The method of claim 1, further comprising computing resistivity differences or ratios between the calculated resistivity results from the two surveys being compared, position-by-position, and outputting the differences or ratios or storing them in computer memory.

23. The method of claim 1, wherein the comparing step comprises outputting or displaying a two- or three-dimensional map of resistivity values for each survey, and then determining any increase or decrease, from one survey to a later survey, in size of a portion of the reservoir defined by having a resistivity value greater than or less than a pre-selected value, or falling within a pre-selected range of resistivity values.

24. The method of claim 2, further comprising determining hydrocarbon fluid movement occurring in the subsurface region between the time of the initial survey and the time of at least one later survey, said determination being based on the calculated fluid saturation values from the different surveys.

25. The method of claim 1, wherein all electromagnetic field data for each survey is generated using a single electromagnetic survey source that produces both vertical and horizontal currents.

26. The method of claim 1, wherein the recorded electromagnetic survey data obtained in (a) and used in (b) consist of one or more electromagnetic field components sensitive at least predominantly to vertical resistivity and one or more electromagnetic field components sensitive at least predominantly to horizontal resistivity.

* * * * *